United States Patent [19]

Batson

[11] 4,176,571

[45] Dec. 4, 1979

[54] GUARD MECHANISM FOR RADIAL SAW

[75] Inventor: William A. Batson, Pickens, S.C.

[73] Assignee: The Singer Company, New York, N.Y.

[21] Appl. No.: 870,533

[22] Filed: Jan. 18, 1978

[51] Int. Cl.² .......................... B27B 5/20; B27B 5/29; B27G 19/04

[52] U.S. Cl. .................... 83/397; 83/471.3; 83/478

[58] Field of Search ............. 83/478, 397, 471.3, 83/544

[56] References Cited

U.S. PATENT DOCUMENTS

| 1,481,569 | 1/1924 | Tannewitz | 83/478 X |
|---|---|---|---|
| 3,821,918 | 7/1974 | Niehaus et al. | 83/478 X |
| 3,884,101 | 5/1975 | Silkin | 83/478 X |
| 3,913,437 | 10/1975 | Speer et al. | 83/478 |
| 3,965,787 | 6/1976 | Plischke | 83/478 |
| 4,028,975 | 6/1977 | Bennott | 83/478 X |

Primary Examiner—J. M. Meister
Attorney, Agent, or Firm—Robert E. Smith; Harold Weinstein; Edward L. Bell

[57] ABSTRACT

A guard mechanism for a radial saw having a motor powered saw blade mounted in a housing slidable on a support arm of a frame shiftable between a rearwardly non-cutting position and a forwardly cutting position. The guard mechanism comprises a guard pivotally mounted to the housing for covering a front portion of the blade, and means carried by the housing to contact the frame for raising the guard whenever the housing is shifted to its rearward non-cutting position.

12 Claims, 9 Drawing Figures

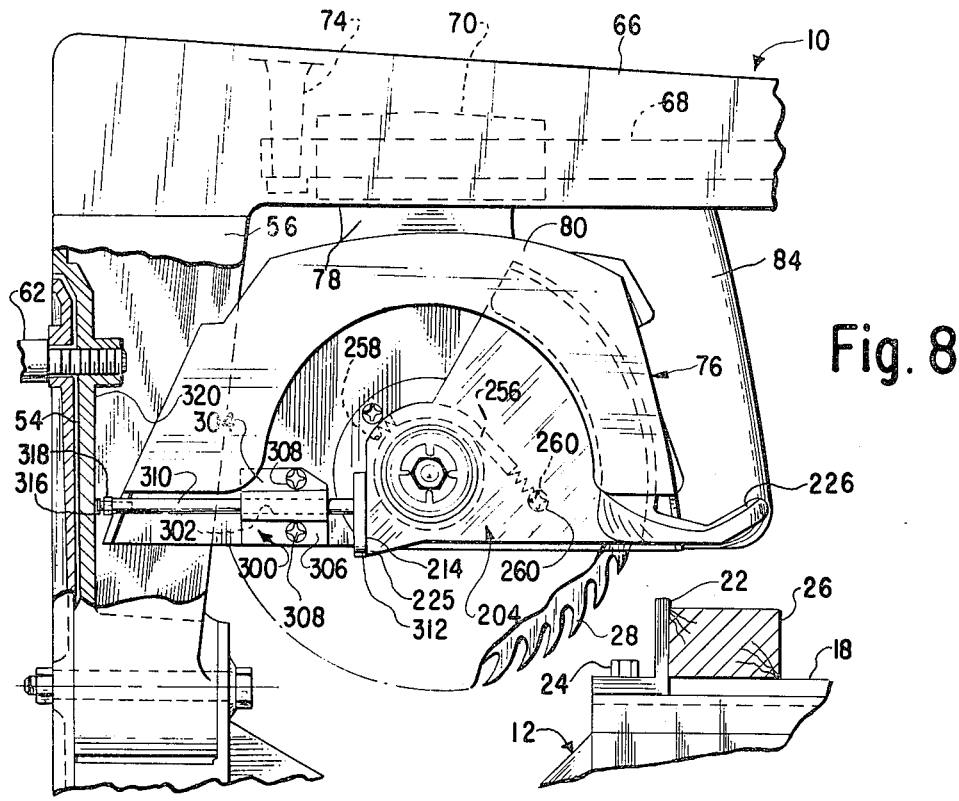
Fig. 8
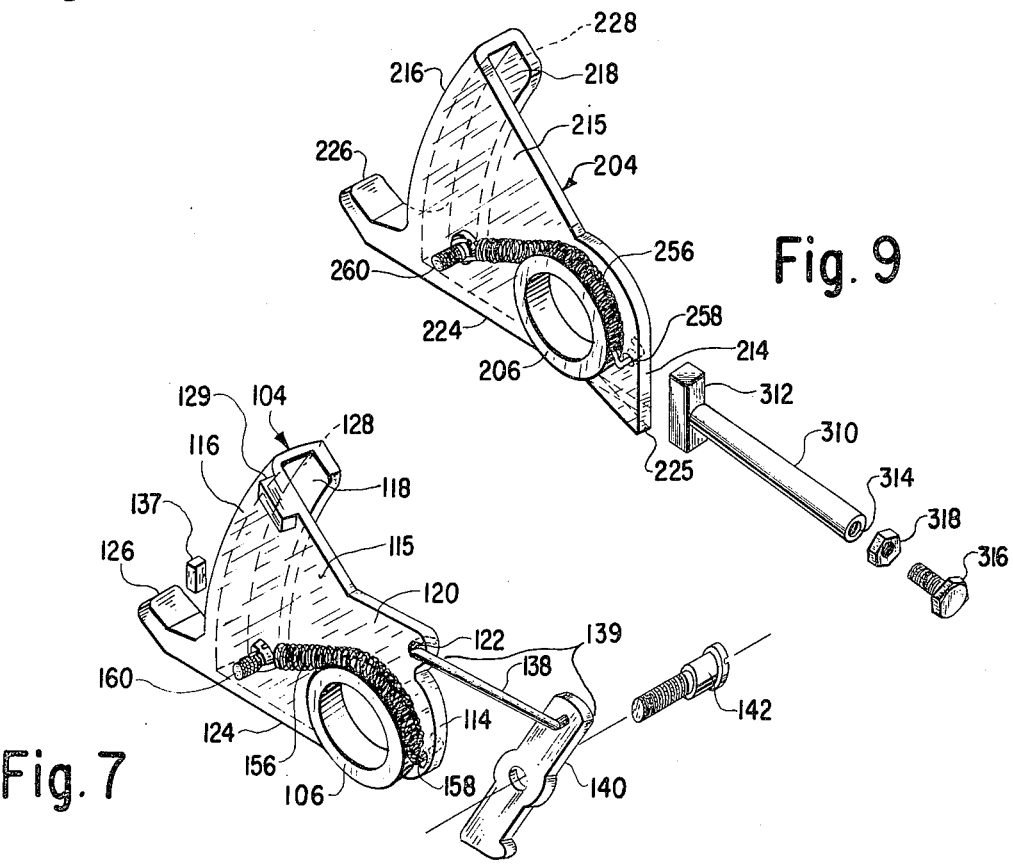
Fig. 9
Fig. 7

GUARD MECHANISM FOR RADIAL SAW

BACKGROUND OF THE INVENTION

Heretofore, guards for radial saws in the prior art have taken various forms from manually releasable to solely work actuated. However, prior art blade guards have been faulty, complex, and costly. Also, multicomponent guards tend to be more susceptible to jamming or binding so as to cause the dual problems of not raising properly to permit cutting, or failing to subsequently return to the guard position upon completion of the cutting.

SUMMARY OF THE INVENTION

It is an object of the present invention to provide an improved guard mechanism for radial saws which overcomes the prior art disadvantages; which is simple, economical and reliable; which is automatically raised upon the saw being placed in a stored non-cutting position, or free to contact a work piece during the cutting operation when the saw is moved across the work piece; which is normally spring biased toward the work piece; which will cover the front edge of the cutting blade; which uses a lever actuated link to raise the guard; or which uses a push rod to raise the guard.

Other objects and advantages will be apparent from the following description of several embodiments of the invention and the novelty features will be particularly pointed out hereinafter in the claims.

BRIEF DESCRIPTION OF THE DRAWINGS

This invention is illustrated in the accompanying drawings in which:

FIGS. 4, 5 and 6 are diagrammatic representations of operation of the improved blade guard wherein FIG. 4 shows it in the raised, stored, position; FIG. 5 shows it released and engaging the work just before the cutting blade contacts the work piece; and FIG. 6 shows the improved guard subsequent to cutting.

FIG. 7 is a perspective view of the improved guard and raising mechanism of the embodiment shown in FIG. 1.

FIG. 8 is a side elevational view of a radial saw including another embodiment of the improved guard.

FIG. 9 is a perspective view of the guard and raising mechanism of the embodiment of FIG. 8.

DESCRIPTION OF THE INVENTION

Figure 1:
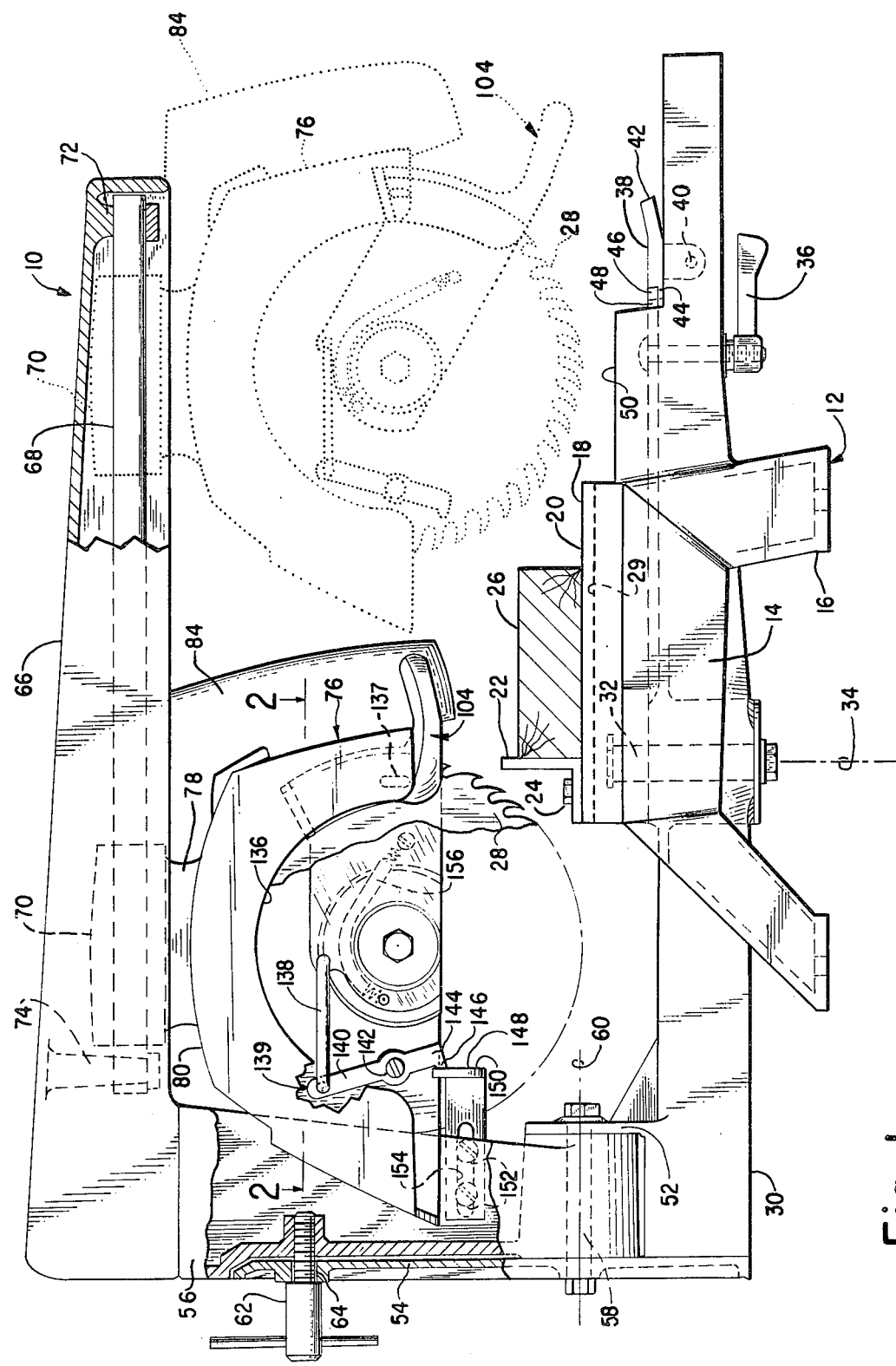
FIG. 1 is a side elevational view, partly in section, of a radial saw including one embodiment of the present invention.

In the preferred embodiment of the invention illustrated in FIGS. 1-7 a radial saw, designated generally 10, is shown in FIG. 1. The saw 10 includes a work table 12 having a base 14 from which a plurality of legs 16 extend downwardly from the corners thereof to rest on a suitable surface (not shown). A work support 18 is connected atop the base 14 and has a top surface 10 to which a fence 22 is connected as by bolts 24. A workpiece 26 is placed upon the top surface 20 to abut the front face of the fence 22 in which position the workpiece 26 will be cut by the saw 10 being drawn forwardly across the workpiece 26. The fence 22 has a cutting slot (not shown) through which a circular saw blade 28 of the radial saw 10 will pass as its lowest edge is confined in a cutting groove 29 during the cutting operation.

A frame 30 is connected to the work table 12 by a pin 32 so as to pivot about a pivotal axis 34. The frame is selectively clamped in any one of a plurality of horizontal cutting position by either a forwardly disposed locking lever 36 which can be used for any angle, or by a quick clamp 38 pivotally connected to the frame at 40 and released by depressing a raised finger 42 while it is clamped by a clamp finger 44 being snapped into engagement with a detent 46 formed in the leading edge 48 of a front apron 50 of the work table 12. Suitable detents 46 may be formed corresponding to any "popular" or frequently used angle such as 30°, 45°, 60° etc. angle so that the frame 30 may be quickly positioned and clamped at the desired angle of cut whether such angle is used for repeated cuts, as occurs in miter and compound angle cuts, or a single angle special cut.

The rear end of the frame 30 shown in FIG. 1 has a pair of brackets of which the front bracket 52 is short and the rear bracket 54 is long. A post 56 has its bottom end disposed between the brackets 52 and 54 to be connected therebetween by a pin 58 so as to pivot about a pivotal axis 60. A threaded clamp 62 extends through a slot 64 of the bracket 54 to be threadedly received in the post 56 to lock the post 56 at a desired angle of cut relative to a vertical plane. For purpose of the present invention, it can be assumed that the clamp 62 is set at the vertical plane which is perpendicular to the horizontal plane of the top surface 20, and that the locking levers 36 and 38 are set for straight cutting.

A support arm 66 is affixed atop the post 56 to cantilever over the work table 12. A pair of support rods 68, 68 carries a slide 70 which is slidable on the rods between a front boss 72 and a rear boss 74, which bosses have the ends of the rods 68, 68 connected thereto.

Figure 2:
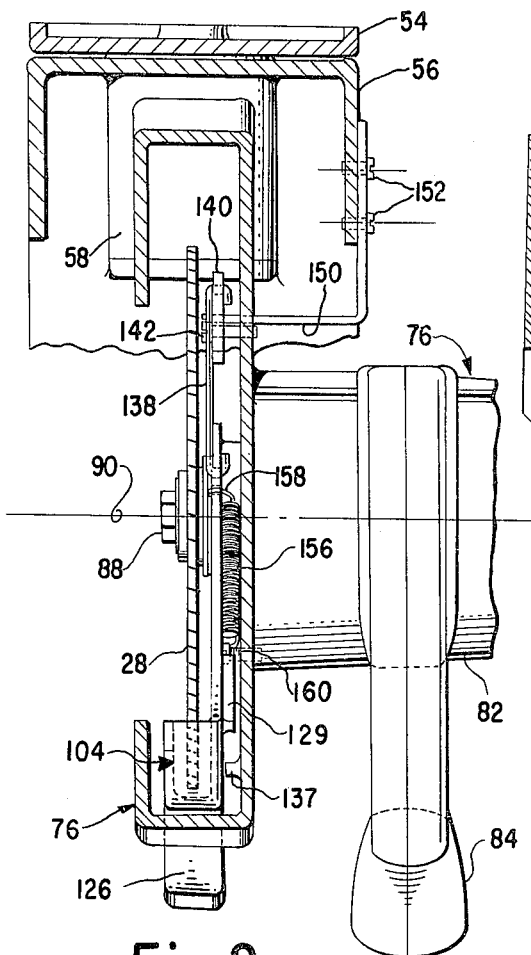
FIG. 2 is a top plane view taken along line 2-2 of FIG. 1.
Figure 3:
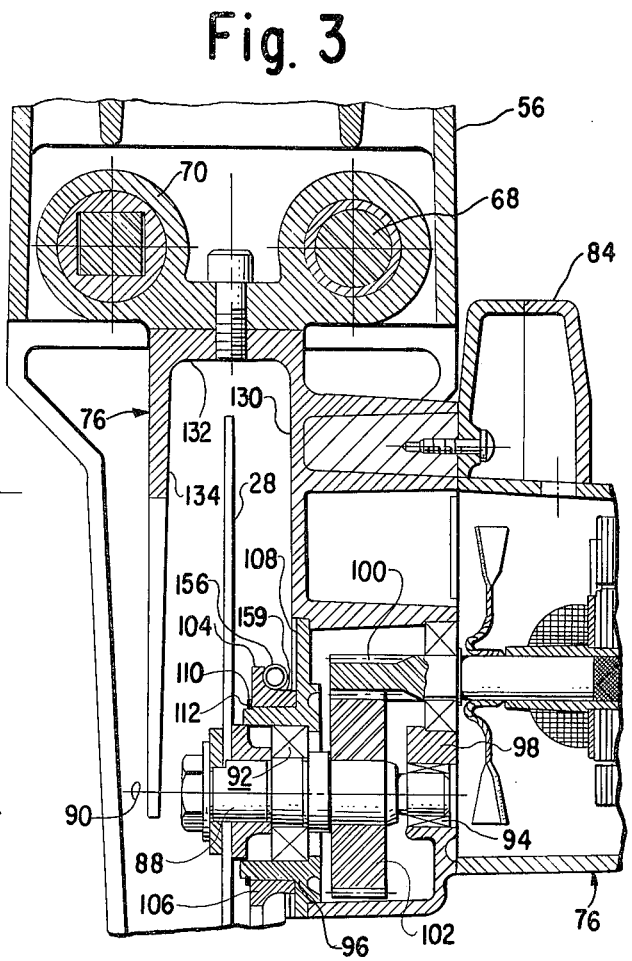
FIG. 3 is a fragmented front elevational view, in section, showing the mounting details of the improved blade guard.

A saw housing 76 includes an intermediate bracket 78, which extends between the slide on its top side, and a fixed blade housing 80 and a motor housing 82 disposed on its bottom side. A handle 84 illustrated in FIGS. 1 and 2 is connected to extend from the forward side of the motor housing 82 on the side of the bracket 78 remote from the blade housing 80. A switch (not shown) is mounted in the handle to activate an electric motor mounted in the motor housing 82, which motor powers the saw blade 28. The operator will grasp the handle 82 to move the saw housing 76 in a reciprocatory motion between its stored non-cutting rearwardly position illustrated in FIG. 1 wherein the circular saw blade 28 is located behind the fence 22, and cutting through the work piece 26 wherein it passes within the cutting groove 29 to a forwardly extending position depicted in FIG. 1 by the dotted line representation of the saw housing 76. Upon the saw blade 28 crossing through the cutting slot in the fence 22 the saw housing 76 and the rotating saw blade 28 are in the cutting position and will remain so until returned to the stored position. The saw blade 28 is mounted on a spindle 88 to be rotated about an axis of rotation 90 as illustrated in FIGS. 2 and 3. The spindle 88 is journalled in a pair of axially spaced bearings 92 and 94 which are mounted in an outer hub 96 and an inner hub 98, respectively. A pinion 100 extends from the electric motor beyond the inner bearing 94 to drive a gear 102 affixed to the spindle 88 to thereby rotate the spindle 88. A bolt 89 is threaded into a tapped hole in the spindle 88 to clamp the saw blade 28 thereto. The hub 96 is formed on the inner side and immediately below the fixed blade housing 80.

The improved blade guard 104 is illustrated in FIGS. 1, 2 and 3 as having a hub 106 the inner periphery of which is journalled upon the housing hub 96 with its inner end adjacent an inner wall 108 which extends radially outwardly from the hub 96. The outer end of the hub 106 is held in place by a retaining ring 110 received in a groove 112 formed in the outer periphery of the hub 96. The hub 106 is sized to loosely fit upon the hub 96 so as to permit the guard 104 to rotate thereon as it is raised or lowered as more fully explained hereinafter. The axially extending hub 106 turns outwardly into a radially extension 115 in FIGS. 1, 3 and 7 which terminates on one side with a short semicircular flange 114 the upper end of which continues upwardly into the extension 115 the outer end of which is turned radially outwardly at 116 for a short distance parallel to the axis 90 and finally terminates in a short bent back flange 118 which is parallel to the flat extension 115 each of which are perpendicular to the axis 90. A flat sided protrusion 120 defining an ear having an aperture 122 is formed intermediate the extension 115 and the flange 114. The bottom edge of the extension 115 is flat as at 124 and runs past the front member 116 to terminate in a projecting guide 126 which extends the width of the front 116 and has its leading end raised upwardly. The front member 116 is curved from the axis 90 at a radius larger than that of the saw blade 28. A hollow 128 is formed between the extension 115, the front member 116 and the rearwardly extending flange 118. The saw blade 28 will be disposed within the hollow 128. A stop tab 129 is formed at the inside upper edge of extension 115 adjacent the front 116 as shown in FIGS. 1, 2 and 7.

The fixed blade housing 80 encloses the upper half of the saw blade 28 as illustrated in FIGS. 1 and 3, with a substantially solid inner wall 130 which is a continuation of the hub flange 108, which wall 130 extends radially outwardly and above the radius of the saw blade 28 to terminate in a transverse portion 132 having a width wider than the front member 116. A radially downwardly extending flange 134 continues from the portion 132 to enclose the saw blade 28 teeth and provide a semicircular opening 136 for access during assembly or disassembly of the saw blade 28. A boss 137 projects outwardly from the wall 130 on its forward portion on a quadrant line with the axis 90 to define a stop for the tab 129, as illustrated in FIGS. 1, 2 and 7. The blade guard 104 is sized to nest within the fixed blade housing 80 as is shown in the solid line representation illustrated in FIG. 1 wherein the saw housing 76 is shown in the stored rearwardly non-cutting position. The raised position of the blade guard 104 is controlled by a raising mechanism 139 including a wire formed link 138 having one end connected in the aperture 122 and the other end connected to move with the free end of a lever 140 which in turn is pivotally connected by a shoulder screw 142 which is threadedly received within the inner wall 130 of the fixed blade housing 80 as shown in FIGS. 1, 2 and 3. The lower end 144 of the lever 140 has a finger 146 facing in the direction of the post 56 and adapted to engage the flat face 148 of a pusher plate 150 adjustably mounted to the post 56 by a pair of screws 152 disposed in a horizontal slot 154 of the plate 150. As the saw housing 56 is moved rearwardly, the finger 146 contact the plate 150 to force the lever 140 to swing counterclockwise whereby the link 138 will be moved toward the post 56 to raise the blade guard 104 above the fence 22 and place the lower straight edge 124 in the substantially horizontal plane shown in FIG. 1.

A spring 156 has one end connected to an aperture 158 of the flange 114 of the blade guard 104 with its body held within the cavity 159 formed between the flange 114 and the inner wall 108 so as to encircle the upper portion of the hub 106 and the other spring 156 end is attached to a screw 160 which is threadedly received in the inner wall 130 forwardly of the spindle 88 as shown in FIGS. 1, 2 and 3. The spring 156 will normally bias the blade guard 104 to rotate clockwise into a work engaging position, outwardly of the fixed blade housing 80 as shown in the dotted line representation of the blade guard 104 of FIG. 1 wherein the saw housing 76 is in the forward position. The blade guard 104 is unbalanced on the right side as viewed in FIG. 1 so that it has a natural tendency to aid the spring bias.

The main object of the present invention to provide a second, movable guard which will prevent the operator from accidently contacting the cutting edge of the saw blade 28 during the cutting operation. Accordingly the blade guard 104 is designed to be operative and free to move responsive to the height of the workpiece 26 at all times during the cutting operation, and only is raised to a non-operative stored position when the circular saw blade 28 and saw housing 76 are placed in the stored position behind the fence 22.

When the saw housing 76 is moved to the stored position to bring the lever 140 into engagement with the plate 150, force exerted by the lever 140 will overcome the bias of the spring 156 so as to produce a positive raising in the counterclockwise direction as viewed in FIG. 1 of the blade guard 104.

Figures 4, 5:
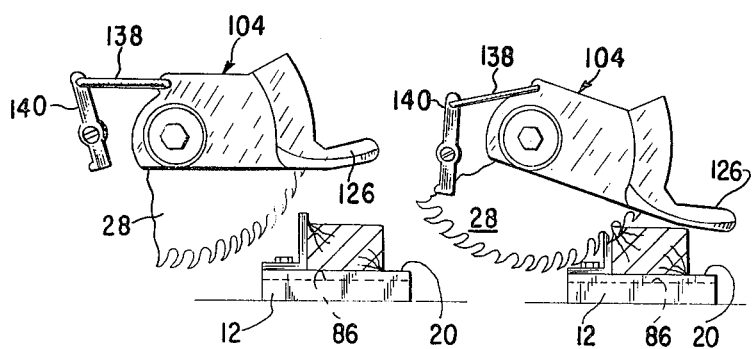
Figure 6:
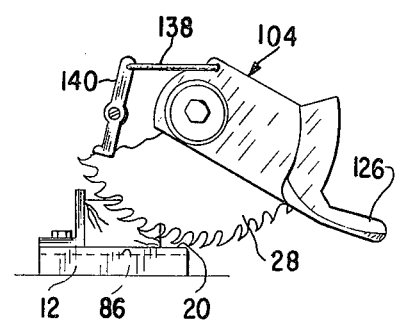

While it is desirable to cover the front edge of the saw blade 28 such protection must not interfere with the translatory motion of the saw blade 28 through the cutting slot of the fence 22, or its engagement with the workpiece 26. However, it is recognized that so long as the saw blade 28 remains in the stored position behind the fence 22, it is the fence 22 which acts as a natural obstacle to prevent any contact with the saw blade 28. Once the saw housing 76 is moved forwardly, the lever 140 is released from the plate 150 so as to release the blade guard 104 to its natural and spring biased forces which swing it in a clockwise motion as viewed in FIG. 1. In the stored position the forwardly projecting guide 126 extends in superposition over both the fence 22 and the workpiece 26 as is illustrated in FIGS. 1 and 4 so that upon release of the blade guard 104 the guide 126 will swing downwardly to engage either or both fence 22 and the workpiece 26 as is illustrated in FIG. 5. Thus, in the cutting position the forward portion of the saw blade 28 below the fixed blade housing 80 is continually covered by the blade guard 104 which remains free to swing up or down corresponding to the shape of the workpiece 26 being cut while still preventing exposure of the front portion of the saw blade 28. Of course the workpiece 26 provides a natural barrier which covers that portion of the saw blade 28 below the blade guard 104. Upon completion of the cutting operation as illustrated in FIG. 6, the blade guard 104 will have its guide 126 stopped a short distance above the top surface 20 of the table due to the tap 129 engaging the boss 137. The shape of the guide 126 being bent upwardly at its tip prevents binding or catching upon the fence 22 or the workpiece 26 so as to aid in the upward or downward motion of the blade guard 104.

A second preferred embodiment of the invention is shown in FIGS. 8 and 9 wherein like reference characters will designate equivalent or similar components set forth hereinbefore. A radial saw 10 includes a saw housing 76 shown in the stored position behind the fence 22 in FIG. 8. A blade guard 204 nests within a fixed blade housing 80 in its raised position in a manner similar to that of the blade guard 104. A tension spring 256 has one end connected in an aperture 258 formed on the side of the guard 204 facing the post 56. The spring 256 encircles the upper portion of the hub 206 and has its forward end affixed to a screw 260 which is threadedly received in the inner wall of housing 80. The guard 204 has a forwardly extending member 215 the arcuate forward member 216 extends over the cutting teeth of the saw blade 28 and turns into a short rearwardly extending flange 218 so as to define a hollow blade cavity 228. A guide 226 is of equal width and projects from the lower end of the member 216, and runs into the flat bottom 224 to a point below the axis 90 wherein it tapers downwardly a short distance, ending at cam point 225 before turning into a vertical cam edge 214 the upper surface of which curves around to meet the member 215.

A push rod bearing 300 has a circular portion 302 which terminates in two flat ends 304 and 306 which are connected against the inner wall of the housing 80, by screws 308, on the side facing the cam surface 214. A push rod 310 is journalled in the bearing 300 and has a push rod shoe 312 connected to the end opposite the cam surface 214 with the opposite end capped at 314 to receive an adjusting screw 316, to which is fitted a jam nut 318.

With the improved blade guard 204 under the influence of the spring 256, the operation will be the same as that described hereinbefore with reference being made particularly to FIGS. 4, 5 and 6 showing the steps of operation. However, the raising of the blade guard 204 will be under the influence of the cam point 225 and the cam surface 214 as it responds to the push rod shoe 312 increasingly forcing it in the raised position until it reaches the stored position shown in FIG. 8. This is accomplished upon the outer end of the screw 316 contacting the wall 320 of the post 56 wherein continued movement of the saw housing 76 in the direction of the post 56 will increasingly force the shoe 312 away from the bearing 306 and into increasing contact with the cam point 225 and cam surface 214 until the stored position depicted in FIG. 8 is obtained. Prior to the push rod 310 engaging the post 56, and with the blade guard 204 in the lowered operative position only the cam point 225 will be in contact with the push rod shoe 312 and this will cause the push rod shoe 312 to be moved against the push rod bearing 306 to set the lower limits of the descent of the guide 226 of the blade guard 204. The blade guard 204 is free to automatically respond by raising or lowering so as to adjust to the height at which it contacts the workpiece. The push rod 310 does not interfere with the normal operation of the blade guard 204, and will normally be in its rearwardly most position with the shoe 312 against the bearing 308. It will maintain this position until such time as the saw housing 76 is moved to its rearwardly non-cutting position to cause the screw 316 to contact the wall 20, thus triggering the raising of the blade guard 204.

It will be understood that various changes in the details, materials, arrangement of parts and operating conditions which have been herein described and illustrated in order to explain the nature of the invention may be made by those skilled in the art within the principles and scope of the invention.

Having thus set forth the nature of the invention, what is claimed herein is:

1. A guard mechanism for a radial saw having a motor powered saw blade mounted in a housing slidable on a support arm of a frame shiftable between a rearwardly non-cutting position and a forwardly cutting position wherein the blade will engage a workpiece lying on a work table connected to the frame, said guard mechanism comprising:
    (a) a guard for covering a portion of the blade,
    (b) the guard pivotally mounted to the housing, and
    (c) means carried by the housing to contact the frame and to raise the guard away from the work table upon the housing being shifted to its rearwardly non-cutting position.

2. The combination claimed in claim 1 wherein:
    (a) a blade housing formed in the housing to surround the upper portion of the blade, and
    (b) the guard pivotal between the fixed blade housing and the work table.

3. The combination claimed in claim 2 wherein:
    (a) a fence is formed on the work table to have the workpiece abut thereagainst,
    (b) the saw blade is journaled to the housing and rotates about an axis,
    (c) a projection guide formed on the lower edge of the guard, and to extend above the fence when the housing is in the rearwardly non-cutting position for non-interferring movement of the housing relative to the fence, and
    (d) the fence having a blade slot to permit the blade to traverse the fence.

4. The combination claimed in claim 3 wherein:
    (a) a spring interconnected between the guard and the housing to bias the guard toward the work table whereby the guard will be operative unless raised by the raising means.

5. The combination claimed in claim 4 wherein:
    (a) the guard pivot is formed about the blade axis,
    (b) the projection guide has a length less then that of the guard which covers the blade radius, and
    (c) the guard extends over the forward portion of the saw blade.

6. The combination claimed in claim 5 wherein:
    (a) the lower edge of the guard is formed continuous with a first portion of the projection guide so as to define a substantially horizontal line with the guard in the raised position,
    (b) a second portion of the projection guide extends at an angle upwardly and outwardly from the first portion to define a straight line substantially parallel to the upper surface of the work table when the guard is released to permit contact therebetween.

7. The combination in claim 1 wherein:
    (a) the raising means includes a lever and a link,
    (b) the lever is pivotally mounted to the housing with the link interconnecting one side of the lever and the guard,
    (c) the other side of the lever engages the frame upon the housing being placed in the rearwardly non-cutting position whereby the guard would be raised.

8. The combination claimed in claim 7 wherein:
(a) a pusher plate connected to the frame to engage the other side of the lever at a predetermined position.

9. The combination claimed in claim 8 wherein:
(a) the pusher plate adjustably connected to the frame to permit the contact point with the lever to be selectively determined.

10. The combination claimed in claim 9 wherein:
(a) a spring is interconnected between the guard and the housing to normally bias the guard in the downward position whereby the guard will only be raised by the lever contacting the pusher plate.

11. The combination claimed in claim 1 wherein:
(a) the raising means includes a push rod slidably journaled to the housing,
(b) the guard has a cam section engagable by the push rod,
(c) a spring interconnected between the guard and the housing to normally bias the guard in a direction of the work table,
(d) the push rod to engage the frame as the housing is moved into its rearwardly non-cutting position to force the guard into a raised position.

12. The combination claimed in claim 11 wherein:
(a) the push rod has an adjustable length whereby it can be set to contact the frame and the guard at a predetermined position of the housing travel between forward and rearward positions.

* * * * *